(12) United States Patent
He et al.

(10) Patent No.: US 11,686,461 B1
(45) Date of Patent: Jun. 27, 2023

(54) INTELLIGENT LIGHT SOURCE MODULE AND LIGHTING FIXTURE

(71) Applicants: STAR MOUNT ENTERPRISE LIMITED, Hong Kong (CN); SHENZHEN LLLINKIN SMARTHOME CO., LTD, Guangdong (CN)

(72) Inventors: Chonglou He, Hong Kong (CN); Shoucheng Wu, Hong Kong (CN); Shaoqing Luo, Hong Kong (CN)

(73) Assignees: STAR MOUNT ENTERPRISE LIMITED, Hong Kong (CN); SHENZHEN LLLINKIN SMARTHOME CO., LTD, Shenzhen (CN)

( * ) Notice: Subject to any disclaimer, the term of this patent is extended or adjusted under 35 U.S.C. 154(b) by 0 days.

(21) Appl. No.: 17/911,732

(22) PCT Filed: Feb. 24, 2022

(86) PCT No.: PCT/CN2022/077547
§ 371 (c)(1),
(2) Date: Sep. 15, 2022

(30) Foreign Application Priority Data

Dec. 10, 2021 (CN) .......................... 202111508311.5

(51) Int. Cl.
*F21V 23/00* (2015.01)
*F21V 17/12* (2006.01)
*F21V 19/00* (2006.01)
*F21V 5/00* (2018.01)

(52) U.S. Cl.
CPC ............ *F21V 23/005* (2013.01); *F21V 5/007* (2013.01); *F21V 17/12* (2013.01); *F21V 19/0035* (2013.01)

(58) Field of Classification Search
CPC ..................... F21V 5/007; F21V 17/12; F21V 19/001–007; F21V 23/003–009
See application file for complete search history.

(56) References Cited

U.S. PATENT DOCUMENTS 10,914,452 B2 * 2/2021 Zou ........................ F21V 23/005

* cited by examiner

*Primary Examiner* — Jason M Han
(74) *Attorney, Agent, or Firm* — Geoffrey Lottenberg; Berger Singerman LLP

(57) ABSTRACT

The intelligent light source module includes an LED lamp panel, a built-in intelligent drive module, and an integrated lens structure. The built-in intelligent drive module is provided at a middle of the LED lamp panel and electrically connected to the LED lamp panel. A plurality of white-light lamp beads and a plurality of color-light lamp beads are dispersedly arranged at the LED lamp panel outside the built-in intelligent drive module. The integrated lens structure is provided above the LED lamp panel and the built-in intelligent drive module, and includes a plurality of lenses and a raised portion. The raised portion corresponds to the built-in intelligent drive module, the lenses are in one-to-one correspondence with the white-light lamp beads and the color-light lamp beads, and the lenses mix white light emitted by the white-light lamp beads and color light emitted by the color-light lamp beads into uniform light by optical processing.

18 Claims, 11 Drawing Sheets

INTELLIGENT LIGHT SOURCE MODULE AND LIGHTING FIXTURE

CROSS REFERENCE TO RELATED APPLICATION

This application is the National phase under 35 U.S.C. § 371 of International Application No. PCT/CN2022/077547, filed Feb. 24, 2022, which claims the benefit of and priority to Chinese Patent Application No. 202111508311.5, filed Dec. 10, 2021. The entire contents of these patent applications are hereby incorporated by reference herein.

TECHNICAL FIELD

The present disclosure relates to the technical field of lighting equipment, and particularly relates to an intelligent light source module and a lighting fixture.

BACKGROUND ART

The intelligence of lighting fixtures is an increasingly obvious development trend. As users need to adjust photochromic characteristics of the light fixtures according to the external environment and physiological cycle changes during use, the lighting fixtures are required to provide a function of full color temperature (from less than 1,000 K to more than 20,000 K). In addition, besides more and more newly-installed smart lamps, transformation of non-smart lamps is a great market demand. In the process of intellectualized transformation of these non-smart lamps, how to provide a simple and rapid smart replacement of light source on the premise of meeting the standards of all countries is a technical problem to be solved at present.

SUMMARY

An objective of the present disclosure is to provide an intelligent light source module and a lighting fixture to solve the problems in the prior art. The intelligent light source module is easy to assemble, install, replace and maintain, has a good light mixing effect, effectively reduces the density of use of monochromatic light sources, and is easy to adapt to lampshades of various types of ceiling lamps for use.

To achieve the objective, the present disclosure provides the following technical solutions.

The present disclosure provides an intelligent light source module. The intelligent light source module includes an LED lamp panel, a built-in intelligent drive module, and an integrated lens structure. The built-in intelligent drive module is provided at a middle of the LED lamp panel and electrically connected to the LED lamp panel. A plurality of white-light lamp beads and a plurality of color-light lamp beads are dispersedly arranged at the LED lamp panel outside the built-in intelligent drive module. The integrated lens structure is provided above the LED lamp panel and the built-in intelligent drive module, and includes a plurality of lenses and a raised portion. The raised portion corresponds to the built-in intelligent drive module, the lenses are in one-to-one correspondence with the white-light lamp beads and the color-light lamp beads, and the lenses mix white light emitted by the white-light lamp beads and color light emitted by the color-light lamp beads into uniform light by optical processing.

In some embodiments, the intelligent light source module further includes a driving bottom case, an installing hole is formed in a center of the LED lamp panel, the driving bottom case is arranged in the installing hole, and a bottom surface of the driving bottom case is flush with a bottom surface of the LED lamp panel. A groove is formed in the driving bottom case, and the built-in intelligent drive module is arranged in the groove.

In some embodiments, the driving bottom case is made of an insulating material.

In some embodiments, the built-in intelligent drive module includes a first portion and a second portion; the first portion is fixed to the LED lamp panel, the second portion is fixed to a printed circuit board, the printed circuit board is able to be detachably connected to the LED lamp panel, and the first portion and the second portion are connected by a coupler.

In some embodiments, the built-in intelligent drive module is fixedly connected to the LED lamp panel.

In some embodiments, an outer surface of the raised portion is in a shape of arc.

In some embodiments, the LED lamp panel is provided with first screw holes and second screw holes; the first screw holes are located on the LED lamp panel between the built-in intelligent drive module and the white-light lamp beads and the color-light lamp beads, and the second screw holes are located on the LED lamp panel outside the white-light lamp beads and the color-light lamp beads. The integrated lens structure is provided with third screw holes and fourth screw holes, the third screw holes correspond to the first screw holes, and the fourth screw holes correspond to the second screw holes.

In some embodiments, the built-in intelligent drive module includes a WiFi module and/or a Zigbee module and/or a Bluetooth module.

In some embodiments, each lens is made of an insulating material; a wall thickness of each lens gradually increases from a center position of the lens to an edge of the lens; and an outer surface at the center position of the lens is recessed inwards.

The present disclosure further provides a lighting fixture, including the intelligent light source module.

Compared with the prior art, the present disclosure obtains the following technical effects.

The intelligent light source module and the lighting fixture provided by the present disclosure are highly integrated and in an integrated form; the intelligent light source module is convenient to assemble, install, replace and maintain, and has a good light mixing effect. The density of monochromatic light sources is effectively reduced as all lamp beads emit light at the same time, such that the intelligent light source module is small in size, low in cost, and easy to adapt to lampshades of various kinds of ceiling lamps for use.

BRIEF DESCRIPTION OF THE DRAWINGS

To describe the technical solutions in the embodiments of the present disclosure or in the prior art more clearly, the following briefly describes the accompanying drawings for the embodiments. Apparently, the accompanying drawings in the following description show merely some embodiments of the present disclosure, and a person of ordinary skill in the art may still derive other drawings from these accompanying drawings without creative efforts.

Figure 1:
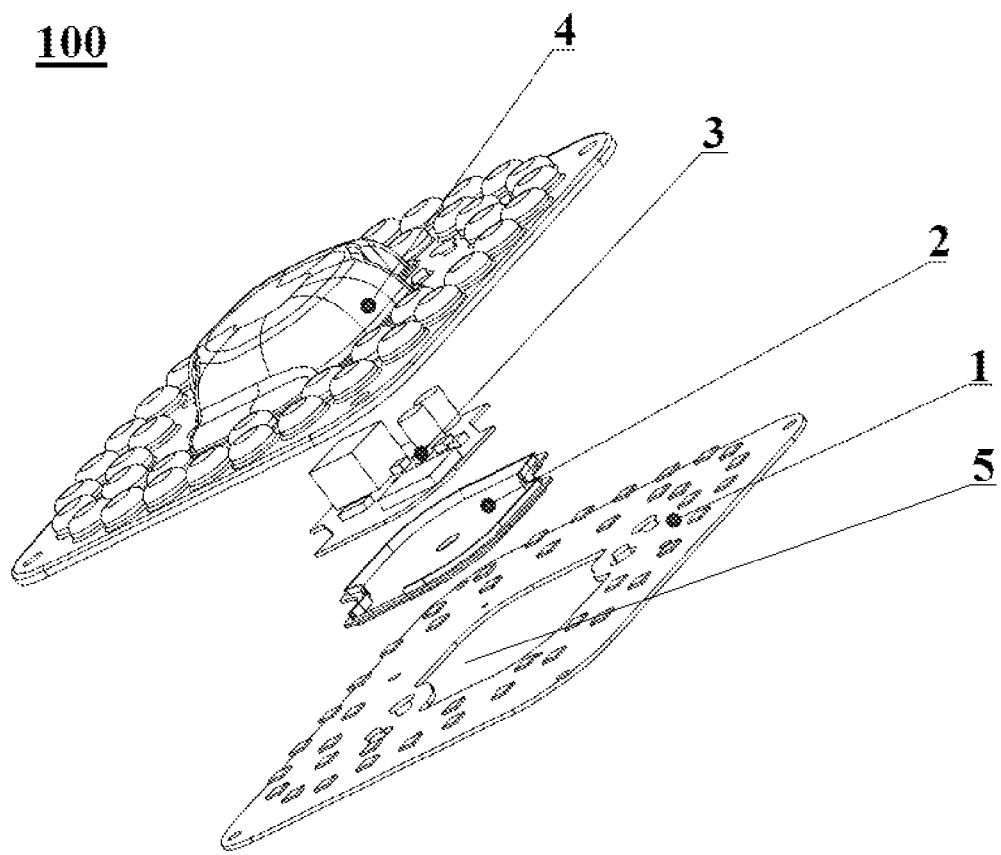
FIG. 1 is a schematic diagram of an intelligent light source module in accordance with the present disclosure (Embodiment I)
Figure 2:
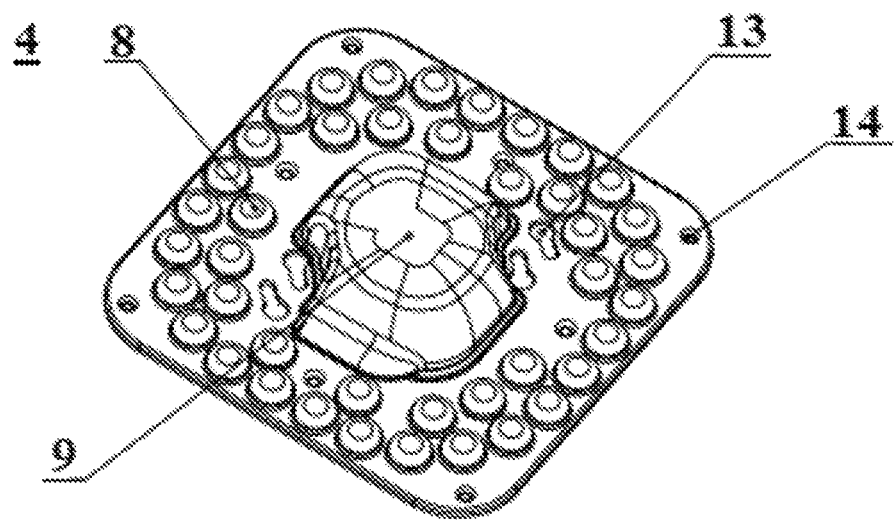
FIG. 2 is a schematic diagram of an integrated lens structure in accordance with the present disclosure.
Figure 3:
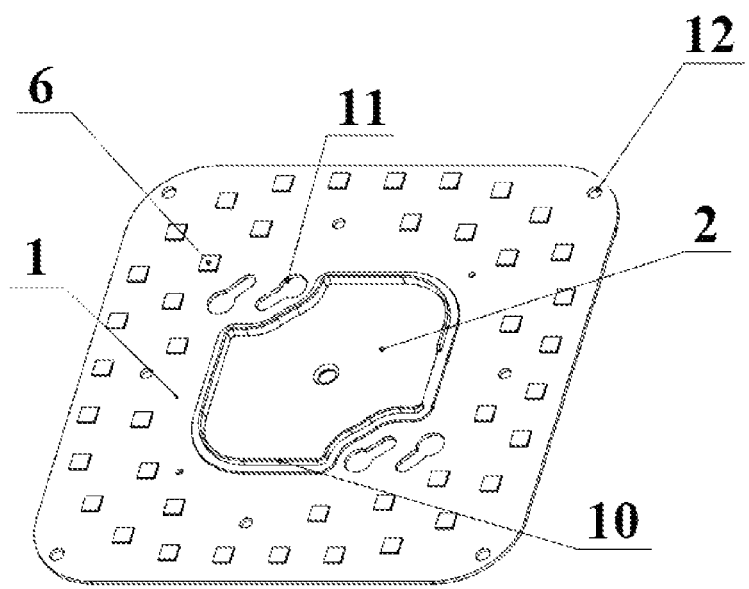
FIG. 3 is a schematic diagram showing installation of a driving bottom case and an LED lamp panel in accordance with the present disclosure (Embodiment I)
Figure 4:
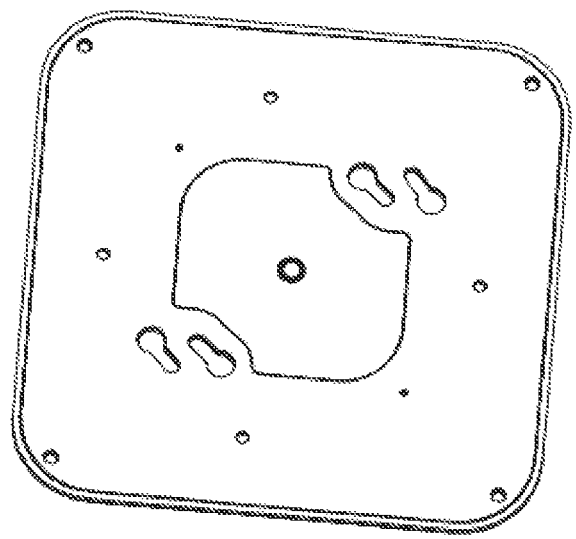
FIG. 4 is a schematic diagram illustrating a bottom surface after the driving bottom case and the LED lamp panel are installed in accordance with the present disclosure (Embodiment I)

Reference numerals: 100-intelligent light source module; 1-LED lamp panel; 2-driving bottom case; 3-built-in intelligent drive module; 4-integrated lens structure; 5-installing hole; 6-lamp bead; 8-lens; 9-raised portion; 10-clamping groove; 11-first screw hole; 12-second screw hole; 13-third screw hole; 14-fourth screw hole.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide an intelligent light source module and a lighting fixture to solve the problems in the prior art. The intelligent light source module is easy to assemble, install, replace and maintain, has a good light mixing effect, effectively reduces the density of monochromatic light sources, and is easy to adapt to lampshades of various types of ceiling lamps for use.

To make the objectives, features and advantages of the present disclosure more apparently and understandably, the following further describes the present disclosure in detail with reference to the accompanying drawings and specific embodiments.

Embodiment I

As shown in FIG. 1 to FIG. 12, this embodiment provides an intelligent light source module 100. The intelligent light source module includes an LED lamp panel 1, a driving bottom case 2, a built-in intelligent drive module 3 and an integrated lens structure 4 which are provided in sequence. An installing hole 5 is formed in a center of the LED lamp panel 1, a plurality of lamp beads 6 are arranged on the LED lamp panel 1, the driving bottom case 2 is arranged in the installing hole 5, the driving bottom case 2 is in clearance fit with the LED lamp panel 1, and a bottom surface of the driving bottom case 2 and a bottom surface of the LED lamp panel 1 are located on the same plane. A groove is formed in the driving bottom case 2, the built-in intelligent drive module 3 is arranged in the groove, and the built-in intelligent drive module 3 is electrically connected to the LED lamp panel 1. The integrated lens structure 4 includes a plurality of lenses 8 and a raised portion 9. The raised portion 9 corresponds to the built-in intelligent drive module 3, and the lenses 8 are in one-to-one correspondence with the lamp beads 6. In accordance with this embodiment, the lamp beads 6 include white-light lamp beads and color-light lamp beads, the white-light lamp beads include two-tone white-light lamp beads, and the color-light lamp beads are RGB color-light lamp beads, i.e., the chips with three colors of red, green and blue (RGB) are placed in one lamp bead 6. In accordance with this embodiment, light of five paths or multiple paths, including three-color light of red, green and blue (color-light lamp beads) and two paths of white light of cold and warm (white-light lamp beads), are mixed, and then pass through the lenses 8 to achieve full-color-gamut color presentation. The lenses 8 may mix the white light emitted by the white-light lamp beads and color light emitted by the color-light lamp beads into uniform light from less than 1,000K to more than 20,000K by optical processing, thereby preventing bright spots and dazzle light.

In accordance with this embodiment, the bottom surface of the driving bottom case 2 and the bottom surface of the LED lamp panel 1 are located on the same plane, such that the intelligent light source module 100 has universality, and may be tightly attached to the bottom case of the lighting fixture to achieve convenient installation and excellent heat dissipation when used to replace a non-intelligent light source module.

In accordance with this embodiment, the lamp beads 6 are uniformly distributed on the LED lamp panel 1 outside the installing hole 5.

In accordance with this embodiment, the built-in intelligent drive module 3 is clamped to the clamping groove 10 at an edge of the groove.

Figure 5:
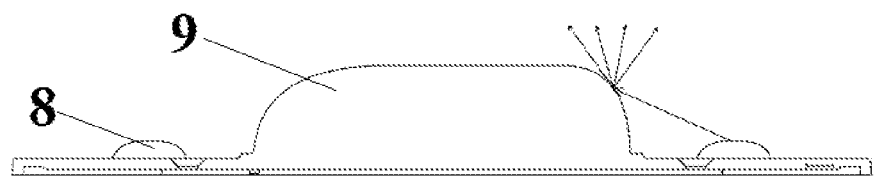
FIG. 5 is a schematic diagram showing arc surface action of a raised portion of the integrated lens structure in accordance with the present disclosure.
Figure 6:
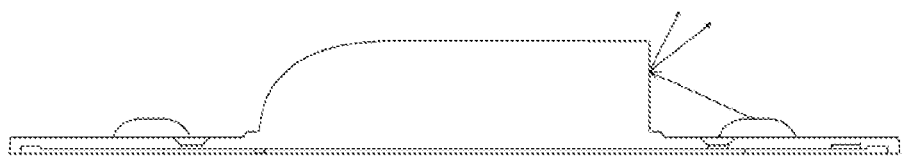
FIG. 6 is a schematic diagram showing a non-arc surface raised portion.

As shown in FIG. 5, in accordance with this embodiment, an outer surface of the raised portion 9 is in a shape of arc, such that the light transmitting through the lenses 8 may be diffused to all directions to avoid of formation of light spots. The integrated lens structure 4 enables the light emitted by the lamp beads 6 to be uniformly diffused out through the lenses 8 without being interfered by the built-in intelligent drive module 3. In accordance with this embodiment, the positions of the lamp beads 6 are away from the raised portion 9 as much as possible.

In accordance with this embodiment, the LED lamp panel 1 is provided with first screw holes 11 and second screw holes 12, the first screw holes 11 are located between the installing hole 5 and the lamp beads 6, and the second screw holes 12 are located outside the lamp beads 6. The integrated lens structure 4 is provided with third screw holes 13 and fourth screw holes 14, the third screw holes 13 correspond to the first screw holes 11, and the fourth screw holes 14 correspond to the second screw holes 12. The screws respectively pass through the third screw holes 13 and the first screw holes 11 in sequence and pass through the fourth screw holes 14 and the second screw holes 12 in sequence, such that the LED lamp panel 1, the driving bottom case 2, the built-in intelligent drive module 3 and the integrated lens structure 4 are connected into a whole and fixed on the bottom case of the lighting fixture. The built-in intelligent drive module 3 is provided in a cavity formed by the raised portion 9 and the driving bottom case 2, and the integrated lens structure 4 may completely cover the LED lamp panel 1.

Figure 7A:
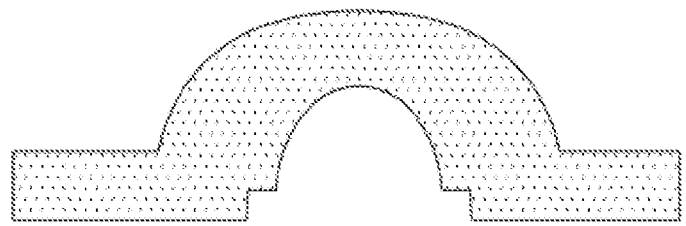
FIG. 7A is a schematic diagram of a lens structure in accordance with the present disclosure.

As shown in FIG. 7A, in accordance with this embodiment, a wall thickness of the lens 8 gradually increases from a center position of the lens 8 to an edge of the lens 8.

Figure 7B:
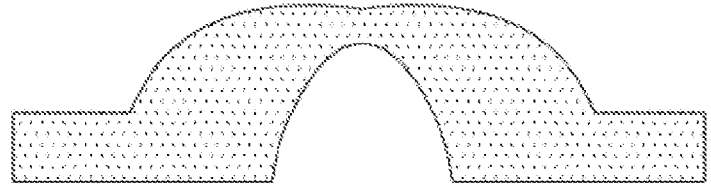
FIG. 7B is another schematic diagram of the lens structure in accordance with the present disclosure.

As shown in FIG. 7B, in accordance with this embodiment, an outer surface at the center position of the lens 8 is recessed inwards.

Figure 8:
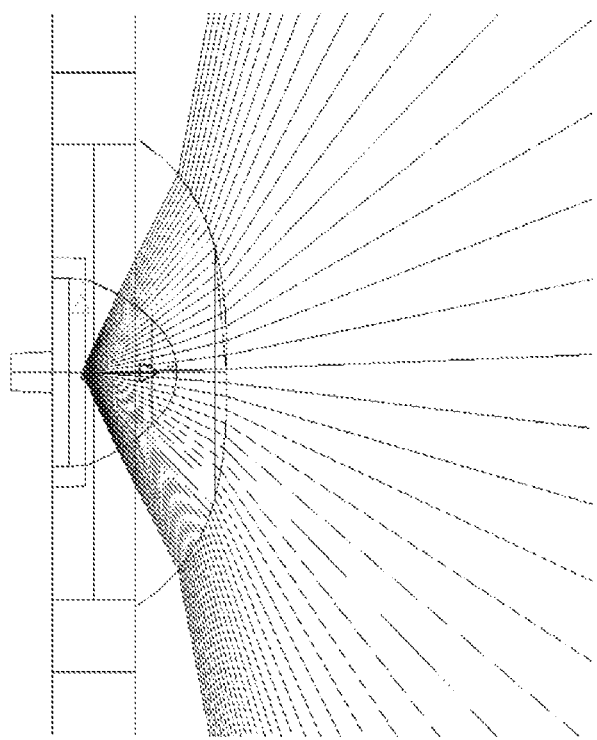
FIG. 8 is a schematic diagram showing lens principles in accordance with the present disclosure.

To ensure the light-emitting effect of the intelligent light source module 100 and guarantee the uniform light mixing of the white light and color light, the lens 8 is provided to guarantee that the light of various wavebands has a good light mixing effect after transmitting through the lens 8, and there is no uneven light emission such as bright spots and shadows on the surface of the lampshade. As shown in FIG. 8, an optical design principle of the lens 8 is as follows: the light emitted by the LED lamp panel 1 is reflected and refracted by the lens 8 in the integrated lens structure 4 to change an output direction of the light, such that light emitting angles of the lamp beads 6 are increased to achieve the good light mixing effect in a limited lamp body space of the ceiling lamp. The basic implementation method is as follows: greatly enhancing the luminous flux output of the light source at a large beam angle while reducing luminous flux in a direction directly ahead of the light source, thereby effectively achieving redistribution of the luminous flux output at each annulus of the light source. The projection surface of the luminous flux of the light source on the lampshade is increased through redistribution, such that light waves with various wavelengths basically completely cover the whole lampshade to avoid phenomenon of light spot gathering on the lampshade.

Figure 9:
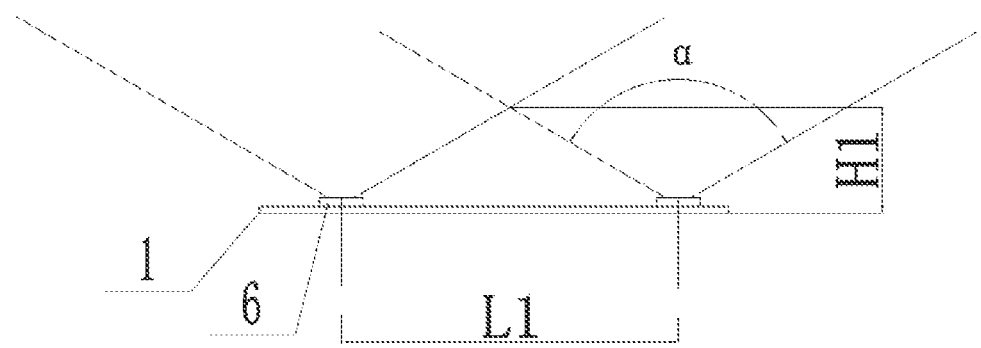
FIG. 9 is a schematic diagram illustrating light-emitting angles, spacings between lamp beads and heights from the lamp beads to a lampshade when lenses are not provided.
Figure 10:
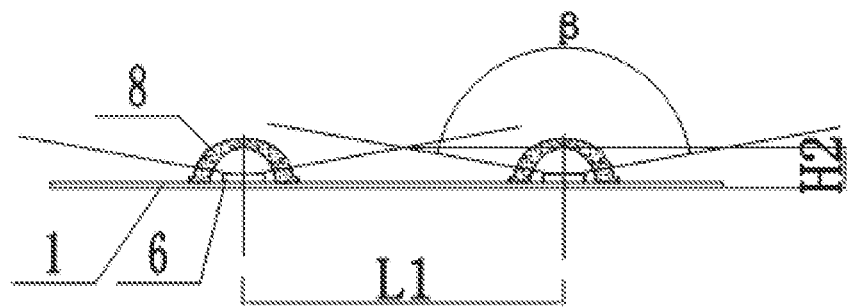
FIG. 10 is a schematic diagram illustrating light-emitting angles, spacings between lamp beads and heights from the lamp beads to the lampshade when the lenses are provided.
Figure 11:
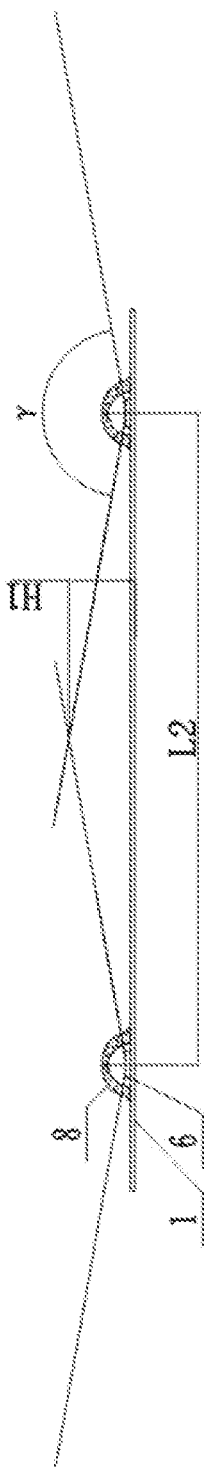
FIG. 11 is another schematic diagram illustrating the light-emitting angles, the spacings between the lamp beads and the heights from the lamp beads to the lampshade when the lenses are provided.

The arrangement of the lens 8 may allow the white-light lamp beads and the color-light lamp beads to operate while mixing light, and the number of the white-light lamp beads and the color-light lamp beads may be less under the condition of achieving the same brightness. In structure, the density of the lamp beads 6 may be lower, the light emitting area of the lamp beads 6 may be smaller, and therefore the size of the intelligent light source module 100 is reduced to achieve lower cost and better replaceability. FIG. 9 is a situation in which the lens 8 is not provided, the minimum spacing between the lamp beads 6 is defined as L1, a height from the lamp beads 6 to the lampshade is defined as H1, and a light-emitting angle is defined as $\alpha$. As shown in FIG. 10, after the lens 8 is added, when the spacing between the lamp beads 6 is also L1, the height H2 from the lamp beads 6 to the lampshade is far less than H1, and a light-emitting angle is $\beta$ which is greater than $\alpha$. As shown in FIG. 11, when the height from the lamp beads 6 to the lampshade is also H1, the spacing L2 between the lamp beads 6 is far greater than L1, and a light-emitting angle is $\gamma$ which is greater than $\alpha$.

In this embodiment, the external shape of the intelligent light source module 100, the shape of each lens 8, the distribution of the lenses 8, and the shape of the raised portion 9 may be changed according to actual demands.

In accordance with this embodiment, the lens 8 and the driving bottom case 2 are both made of insulating materials to achieve electrical isolation for electrified components.

In accordance with this embodiment, the built-in intelligent drive module 3 includes a WiFi module and/or a Zigbee module and/or a Bluetooth module. The built-in intelligent drive module 3 may directly take electricity from the LED lamp panel or a driver, the built-in intelligent drive module 3 is an existing structure, and may be driven wirelessly and intelligently through a non-isolated LED switch power supply or a DOB linear power supply or a combination of the non-isolated LED switch power supply and the DOB linear power supply.

In order to access the Internet of Things, the intelligent light source module 100 of this embodiment is integrated with the built-in intelligent drive module 3, and the built-in intelligent drive module 3 may be driven wirelessly. The intelligent light source module 100 of this embodiment employs the non-isolated LED switch drive.

Non-Isolated LED Switch Drive Solution

Figure 12:
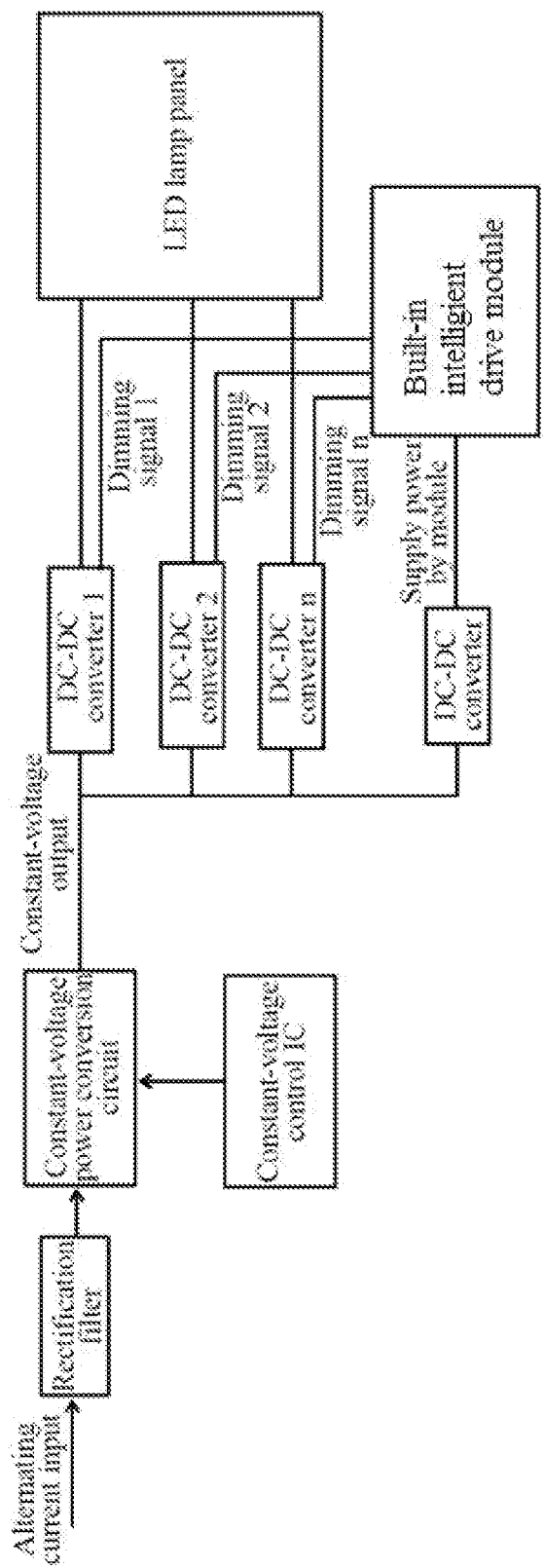
FIG. 12 is a schematic diagram illustrating non-isolated LED switch drive in accordance with the present disclosure (Embodiment I)

As shown in FIG. 12, a circuit mainly includes a rectification filter circuit, a constant-voltage power conversion circuit, a plurality of DC-DC conversion circuits, a power supply circuit for the built-in intelligent drive module 3, and a built-in intelligent drive module 3. After alternating current input of mains supply is converted into direct current by the rectification filter circuit, the direct current is converted into constant-voltage output by the constant-voltage power conversion circuit containing a constant-voltage control IC (integrated circuit), and the constant-voltage output is divided into N+1 paths, where N paths of constant-voltage output provide constant-current drive for light sources of N paths of the LED lamp panel 1 through DC-DC converters, the other one path of constant-voltage output supplies power to the built-in intelligent drive module 3 through a DC-DC converter. An IO (input/output) port of the built-in intelligent drive module 3 controls DC-DC converters of N paths which supply power to the LED lamp panel 1, to adjust driving current for the light source of each path of the LED lamp panel 1, through the PWM (pulse-width-modulation) signal output.

The above circuits are used by way of example, and the techniques of this embodiments include, but are not limited to, the above circuits.

The intelligent light source module 100 of this embodiment enables the lamp beads 6 with various colors to achieve uniform light mixing effect, thereby avoiding the light-emitting face from chromatic aberration, and dark spots do not occur when human eyes observe the surface of the lighting fixture when the lighting fixture is lightened. In addition, secondary light mixing formed by the lens 8 and the lampshade makes the emitting light more uniform.

This embodiment has no need of a separate power supply bin, such that the assembly and production are convenient, and the integration degree is high. The intelligent light source module 100, as a whole, may replace the original ceiling lamp light source module rapidly, thereby upgrading a traditional non-intelligent ceiling lamp into a wireless intelligent ceiling lamp. In later product maintenance, only by uncovering the lens 8, the lamp beads 6 and the built-in intelligent drive module 3 may be exposed for maintenance.

In accordance with this embodiment, the electrified built-in intelligent drive module 3 and the lamp beads 6 are completely wrapped with the highly integrated intelligent light source module 100 and isolated from the outside to meet the electrical insulation requirement and to conform to safety standards of each country, such technology is especially suitable for circuits with high electrical insulation requirements such as non-isolated and DOB linear solution.

In accordance with this embodiment, due to the arrangement of the lens 8 with good light mixing effect, the size of the intelligent light source module 100 is small, and the white light and the color light of red, green and blue may form uniformly light on the lampshade of the ceiling lamp by using fewer lamp beads 6, so that the intelligent light source module is easy to adapt to lampshades of various kinds of ceiling lamps for use. Due to secondary optics of the lens 8, the white-light lamp beads and the color-light lamp beads may emit light at the same time for light mixing, and all the light sources may contribute brightness at the same time, such that the density of the monochromatic light sources is effectively reduced under the condition of achieving the same light emitting brightness of the lighting fixture.

In accordance with this embodiment, after a total of five or multiple paths of LEDs, including independent color lights of red, green and blue and white lights of cold and warm, are subjected to light mixing, full-color-gamut light emission wider than single color light or white light is formed, a user may adjust the color to the most comfortable color at will, and the lighting quality of the environment and the user experience are improved.

Embodiment II

Figure 13:
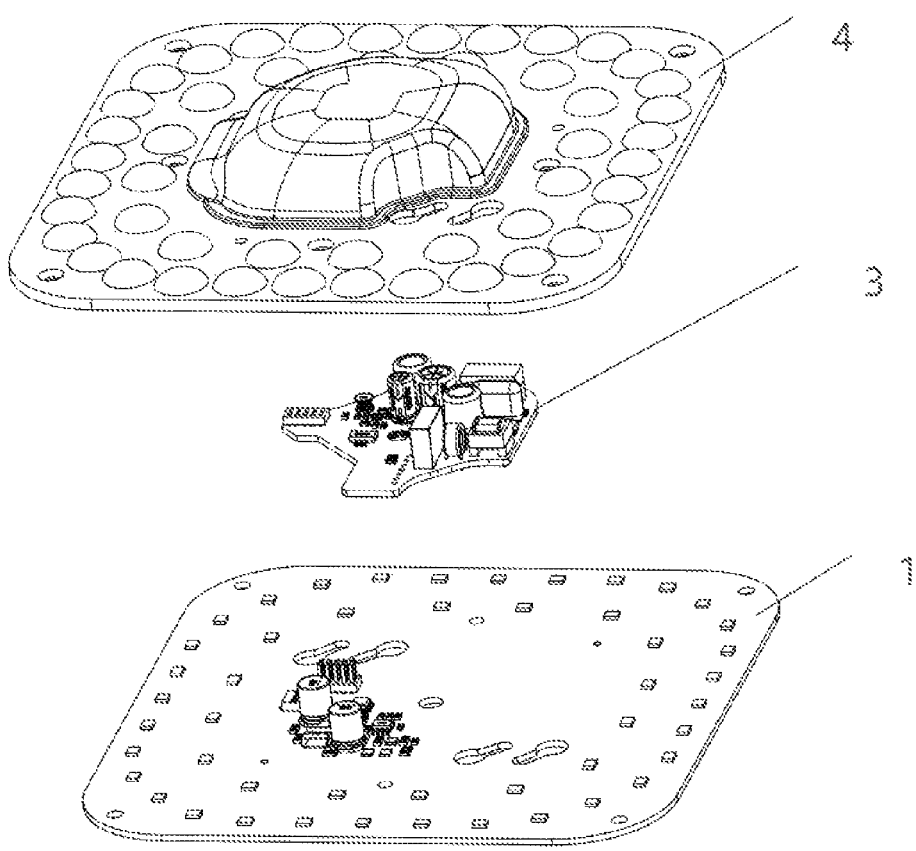
FIG. 13 is a schematic diagram of the intelligent light source module in accordance with the present disclosure (Embodiment II)

As shown in FIG. 13, the difference between this embodiment and Embodiment I lies in that: the built-in intelligent drive module 3 includes a first portion and a second portion. The first portion is welded to the LED lamp panel 1, the second portion is welded to a PCB (printed circuit board), the PCB may be detachably connected on the LED lamp panel 1, and the first portion and the second portion are connected by a coupler.

The first portion is a linear circuit module, and the second portion is a power supply module for one or two or three of a WiFi module, a Zigbee module, and a Bluetooth module.

Figure 14:
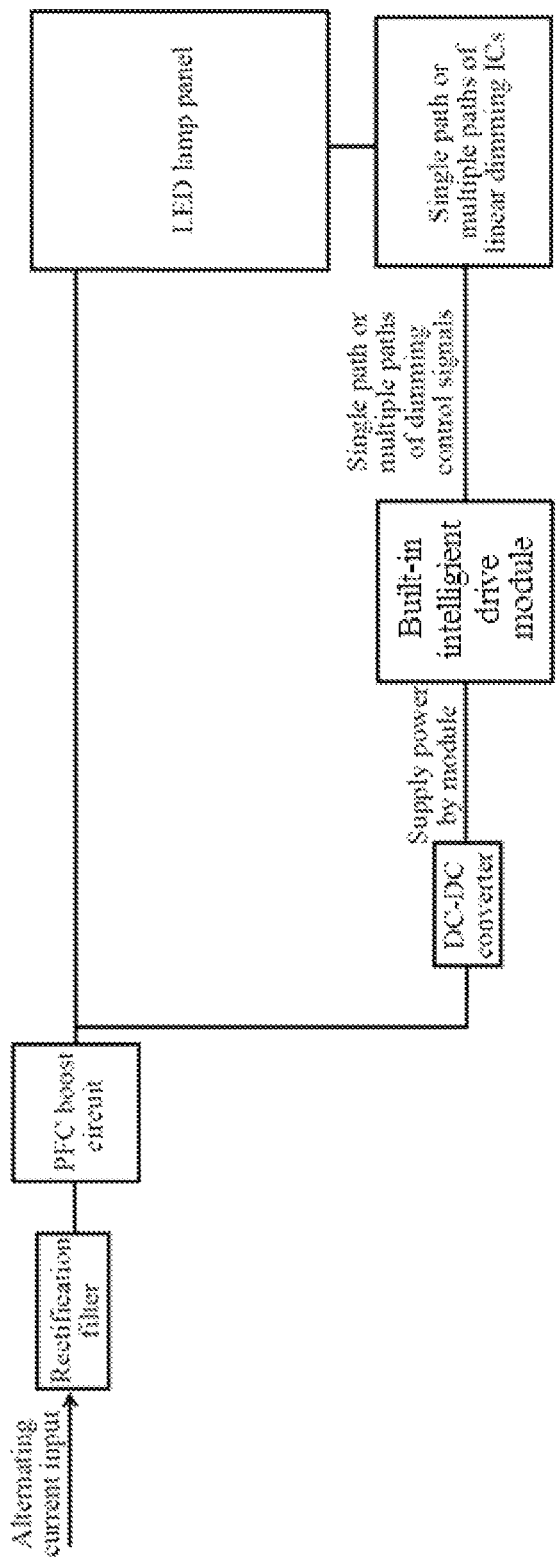
FIG. 14 is a schematic diagram illustrating non-isolated and linear combined LED switch drive in accordance with the present disclosure (Embodiment II)

As shown in FIG. 14, the intelligent light source module 100 of this embodiment employs a non-isolated PFC circuit and linear combined LED switch driving mode. Specifically, the circuit includes a rectification filter, a PFC boost circuit, a linear driver, an intelligent control module and an LED lamp panel 1. After passing through the rectification filter circuit, the mains supply enters the PFC boost circuit for PF value and harmonic factor correction, then a constant-voltage source is output, a linear IC with a PWM dimming function is connected to the LED lamp panel in series, and the intelligent module sends an instruction to the linear IC to achieve the dimming and toning functions.

Embodiment III

Figure 15:
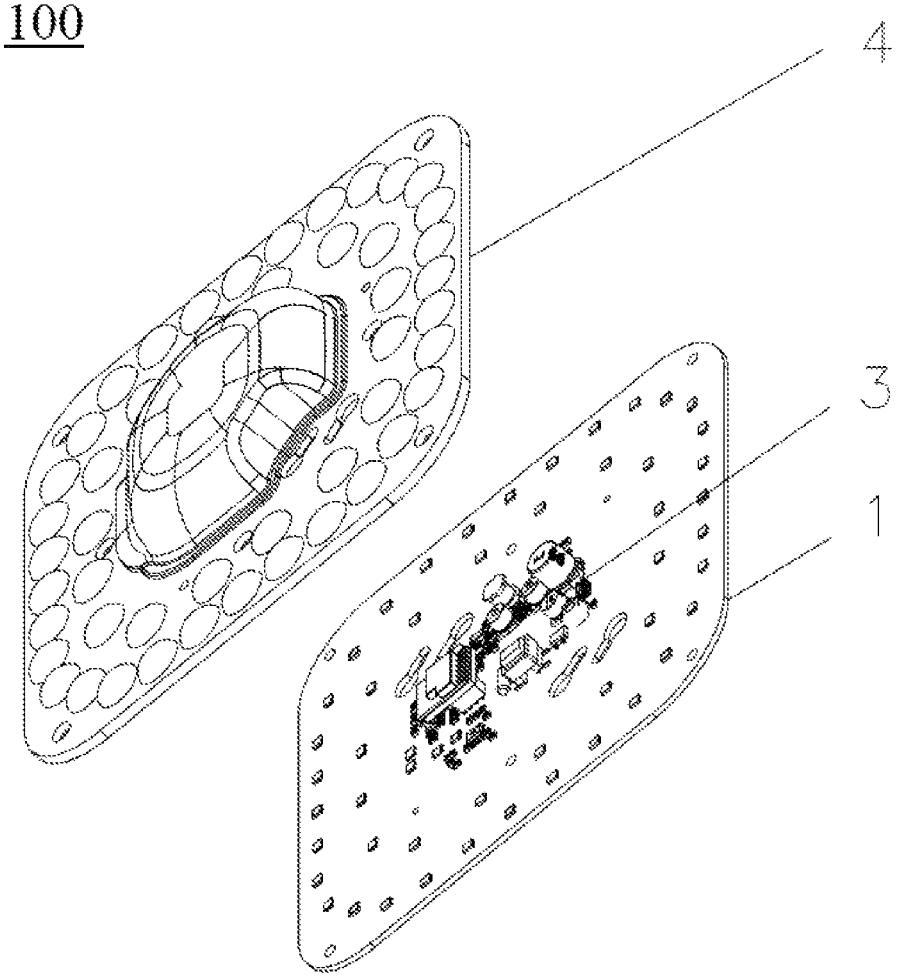
FIG. 15 is a schematic diagram of the intelligent light source module in accordance with the present disclosure (Embodiment III)

As shown in FIG. 15, the difference between this embodiment and Embodiment I lies in that: the built-in intelligent drive module 3 is fixedly connected to the LED lamp panel 1.

The intelligent light source module 100 of this embodiment employs DOB linear drive.

DOB Linear Drive Solution

Figure 16:
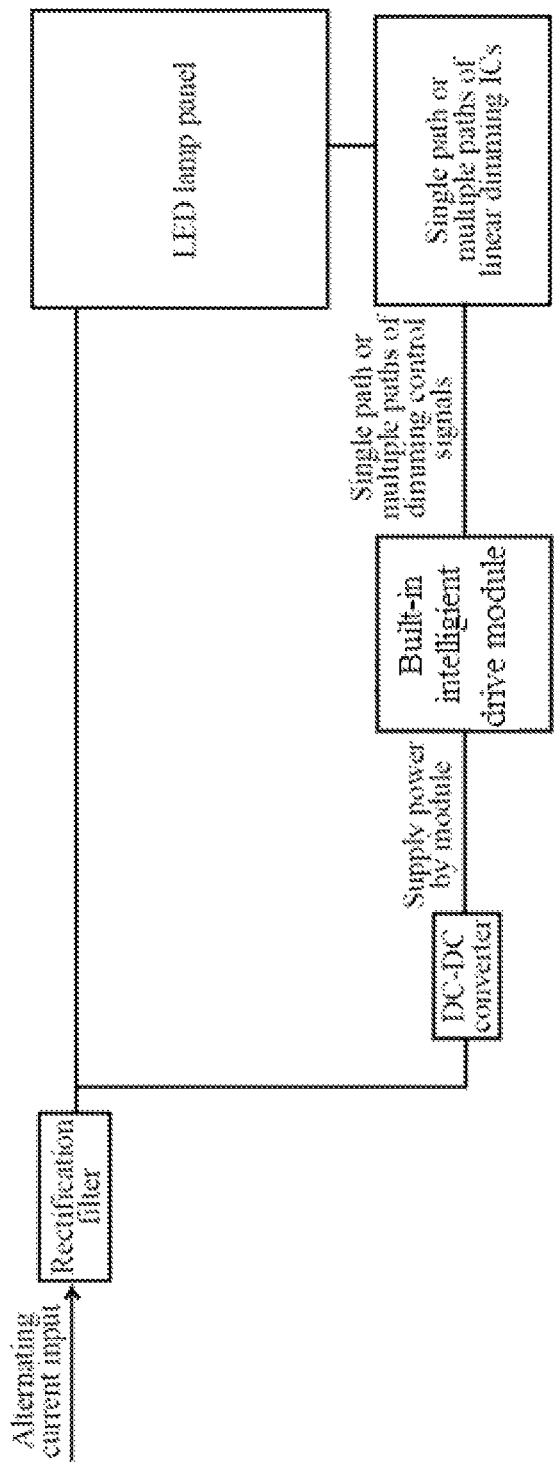
FIG. 16 is a schematic diagram illustrating DOB (driver on board) linear drive in accordance with the present disclosure (Embodiment III).

As shown in FIG. 16, the circuit mainly includes the rectification filter circuit, a power supply circuit of the built-in intelligent driving circuit 3, the built-in intelligent drive module 3, and a linear dimming circuit. After alternating current input of mains supply is converted into direct current by the rectification filter circuit for directly driving the LED lamp panel 1, then the direct current supplies power to the built-in intelligent drive module 3 by the DC-DC converter. An IO port of the built-in intelligent drive module 3 controls single path or multiple paths of linear dimming IC to adjust driving current for light source of each path of the LED lamp panel 1, through the PWM signal output.

Embodiment IV

This embodiment provides a lighting fixture. The lighting fixture includes the intelligent light source module 100 of Embodiment I or Embodiment II or Embodiment III. The intelligent light source module 100 is provided between the lampshade and the bottom case of the lighting fixture, and the lampshade is a PC diffuser. The intelligent light source module 100 may be directly fixed to the bottom case of the lighting fixture, or may be fixed to the bottom case of the lighting fixture by a panel.

Several examples are used for illustration of the principles and implementation methods of the present disclosure. The description of the embodiments is merely used to help illustrate the method and its core principles of the present disclosure. Furthermore, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An intelligent light source module, comprising an LED lamp panel, a built-in intelligent drive module, and an integrated lens structure, wherein the built-in intelligent drive module is provided at a middle of the LED lamp panel and electrically connected to the LED lamp panel; a plurality of white-light lamp beads and a plurality of color-light lamp beads are dispersedly arranged at the LED lamp panel outside the built-in intelligent drive module; the integrated lens structure is provided above the LED lamp panel and the built-in intelligent drive module, and comprises a plurality of lenses and a raised portion; the raised portion corresponds to the built-in intelligent drive module, the lenses are in one-to-one correspondence with the white-light lamp beads and the color-light lamp beads, and the lenses mix white light emitted by the white-light lamp beads and color light emitted by the color-light lamp beads into uniform light by optical processing.

2. The intelligent light source module according to claim 1, wherein the intelligent light source module further comprises a driving bottom case, an installing hole is formed in a center of the LED lamp panel, the driving bottom case is arranged in the installing hole, and a bottom surface of the driving bottom case is flush with a bottom surface of the LED lamp panel; a groove is formed in the driving bottom case, and the built-in intelligent drive module is arranged in the groove.

3. The intelligent light source module according to claim 2, wherein the driving bottom case is made of an insulating material.

4. The intelligent light source module according to claim 1, wherein the built-in intelligent drive module comprises a first portion and a second portion; the first portion is fixed to the LED lamp panel, the second portion is fixed to a printed circuit board, the printed circuit board is able to be detachably connected to the LED lamp panel, and the first portion and the second portion are connected by a coupler.

5. The intelligent light source module according to claim 1, wherein the built-in intelligent drive module is fixedly connected to the LED lamp panel.

6. The intelligent light source module according to claim 1, wherein an outer surface of the raised portion is in a shape of arc.

7. The intelligent light source module according to claim 1, wherein the LED lamp panel is provided with first screw holes and second screw holes; the first screw holes are located on the LED lamp panel between the built-in intelligent drive module and the white-light lamp beads and the color-light lamp beads, and the second screw holes are located on the LED lamp panel outside the white-light lamp beads and the color-light lamp beads; the integrated lens structure is provided with third screw holes and fourth screw holes, the third screw holes correspond to the first screw holes, and the fourth screw holes correspond to the second screw holes.

8. The intelligent light source module according to claim 1, wherein the built-in intelligent drive module comprises a WiFi module and/or a Zigbee module and/or a Bluetooth module.

9. The intelligent light source module according to claim 1, wherein each lens is made of an insulating material; a wall thickness of each lens gradually increases from a center position of the lens to an edge of the lens; and an outer surface at the center position of the lens is recessed inwards.

10. A lighting fixture, comprising an intelligent light source module,
wherein the intelligent light source module comprises an LED lamp panel, a built-in intelligent drive module, and an integrated lens structure; the built-in intelligent drive module is provided at a middle of the LED lamp panel and electrically connected to the LED lamp panel; a plurality of white-light lamp beads and a plurality of color-light lamp beads are dispersedly arranged at the LED lamp panel outside the built-in intelligent drive module; the integrated lens structure is provided above the LED lamp panel and the built-in intelligent drive module, and comprises a plurality of lenses and a raised portion; the raised portion corresponds to the built-in intelligent drive module, the lenses are in one-to-one correspondence with the white-light lamp beads and the color-light lamp beads, and the lenses mix white light emitted by the white-light lamp beads and color light emitted by the color-light lamp beads into uniform light by optical processing.

11. The lighting fixture according to claim 10, wherein the intelligent light source module further comprises a driving bottom case, an installing hole is formed in a center of the LED lamp panel, the driving bottom case is arranged in the installing hole, and a bottom surface of the driving bottom case is flush with a bottom surface of the LED lamp panel; a groove is formed in the driving bottom case, and the built-in intelligent drive module is arranged in the groove.

12. The lighting fixture according to claim 11, wherein the driving bottom case is made of an insulating material.

13. The lighting fixture according to claim 10, wherein the built-in intelligent drive module comprises a first portion and a second portion; the first portion is fixed to the LED lamp panel, the second portion is fixed to a printed circuit board, the printed circuit board is able to be detachably connected to the LED lamp panel, and the first portion and the second portion are connected by a coupler.

14. The lighting fixture according to claim 10, wherein the built-in intelligent drive module is fixedly connected to the LED lamp panel.

15. The lighting fixture according to claim 10, wherein an outer surface of the raised portion is in a shape of arc.

16. The lighting fixture according to claim 10, wherein the LED lamp panel is provided with first screw holes and second screw holes; the first screw holes are located on the LED lamp panel between the built-in intelligent drive module and the white-light lamp beads and the color-light lamp beads, and the second screw holes are located on the LED lamp panel outside the white-light lamp beads and the color-light lamp beads; the integrated lens structure is provided with third screw holes and fourth screw holes, the third screw holes correspond to the first screw holes, and the fourth screw holes correspond to the second screw holes.

17. The lighting fixture according to claim 10, wherein the built-in intelligent drive module comprises a WiFi module and/or a Zigbee module and/or a Bluetooth module.

18. The lighting fixture according to claim 10, wherein each lens is made of an insulating material; a wall thickness of each lens gradually increases from a center position of the lens to an edge of the lens; and an outer surface at the center position of the lens is recessed inwards.

\* \* \* \* \*